(No Model.)
A. H. ZIMMERMAN.
COLD AIR DRAFT REGULATOR FOR FURNACES.
No. 518,984. Patented May 1, 1894.
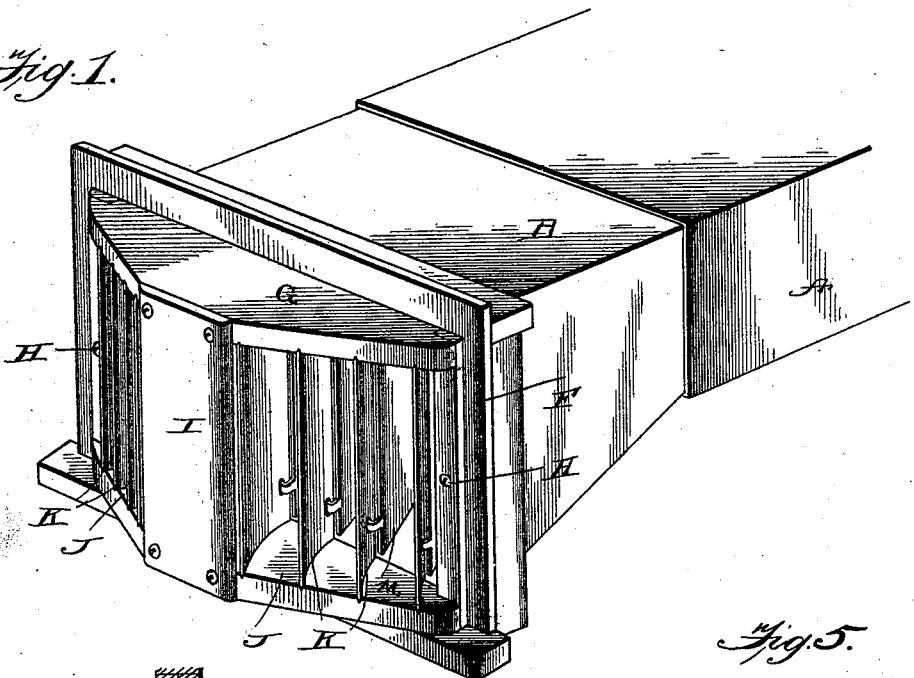
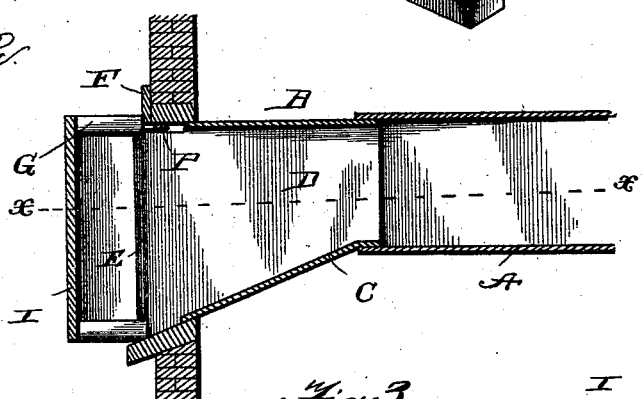
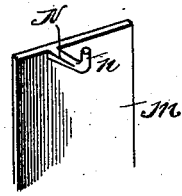
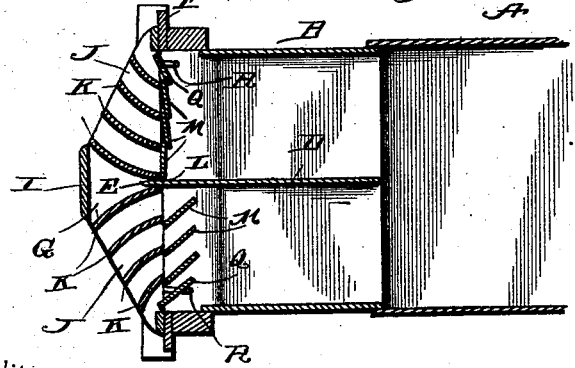
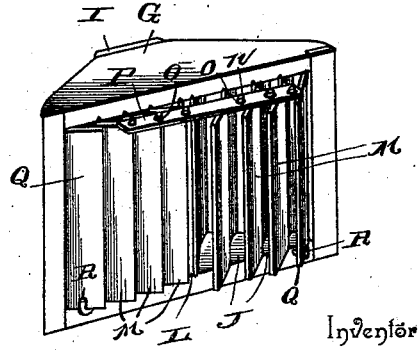
Witnesses
John C. Shaw
D. O. Nothampton
By his Attorneys.
C. A. Snow & Co.
Inventor
August H. Zimmerman

UNITED STATES PATENT OFFICE.

AUGUST H. ZIMMERMAN, OF MILWAUKEE, WISCONSIN.

COLD-AIR-DRAFT REGULATOR FOR FURNACES.

SPECIFICATION forming part of Letters Patent No. 518,984, dated May 1, 1894.

Application filed August 26, 1893. Serial No. 484,149. (No model.)

*To all whom it may concern:*

Be it known that I, AUGUST H. ZIMMERMAN, a citizen of the United States, residing at Milwaukee, in the county of Milwaukee and State of Wisconsin, have invented a new and useful Cold-Air-Draft Regulator for Furnaces, of which the following is a specification.

This invention relates to cold air draft regulators for furnaces; and it has for its object to provide a regulating device adapted to be connected to the outer end of a cold air draft pipe leading from the outside air at the outer wall of a building, into a furnace, in order to supply the same with the necessary quantity of pure cold air, whereby the necessary draft may be maintained while at the same time supplying the requisite fresh air which is to be heated up and distributed throughout a building. In the ordinary cold air draft pipes which have no regulating devices, a good draft is maintained as long as a current of air or wind is circulating through the pipe to the furnace, but when no air is stirring the furnace usually expels heat through the cold air draft pipe and does not take up the necessary cold air. Many objections exist to the ordinary open cold air draft pipe for this reason, and the present invention is intended to obviate all these disadvantages and provide efficient means whereby a constant supply of cold air is circulated to the furnace, and at the same time providing means for preventing escaping heat from the furnace.

With these and other objects in view which will readily appear as the nature of the invention is better understood, the same consists in the novel construction, combination and arrangement of parts hereinafter more fully described, illustrated and claimed.

In the accompanying drawings:—Figure 1 is a perspective view of a cold air draft regulator connected to the outer end of a cold air draft pipe for furnaces. Fig. 2 is a vertical longitudinal sectional view of the same. Fig. 3 is a horizontal sectional view on the line *x—x* of Fig. 2. Fig. 4 is an inner detail in perspective of the removable regulator frame showing more clearly the relative position of the regulating doors or gates. Fig. 5 is a detail in perspective of the upper end of one of the regulating doors.

Referring to the accompanying drawings, A represents an ordinary cold air draft pipe which is designed to lead from the outer wall of a building to the proper part of an ordinary furnace in order to supply the requisite quantity of cold air thereto, and in the present invention the outer end of the cold air draft pipe terminates short of the outside of the wall in order to receive the inner reduced end of the rectangular draft box B. The rectangular draft box B, is provided with an inclined bottom C, flaring toward the outer open end thereof in order to provide a draft box of a widened interior area, which provides for the reception of large quantities of cold air to be directed therefrom through the cold air draft pipe. The said draft box B, is provided with a central vertical partition D, which divides the box into two opposite channels either one of which is designed to accommodate the draft of cold air, according to the direction of the wind currents which strike the regulator outside of the building wall, and said vertical partition D, is provided with a front tongue extension E, which projects slightly beyond the rectangular flanged window casing F. The said flanged window casing F, fits over the outer flared end of the draft box B, and is adapted to be fitted in the outside of a wall of a building in the ordinary position occupied by similar casings which receive the outer end of a cold air pipe.

The window casing F, forms a support for the outer removable regulator frame G. The removable regulator frame G, is approximately triangular in cross section and is removably held to the outside of the window casing F, by the attaching screws H. The frame G, is provided with a central partition board I, separating the frame into opposite draft openings J, each of which communicates with one of the channels located at both sides of the vertical partition D, of the draft box, and fitted into the opposite draft openings J, is a regularly spaced series of vertical deflecting bars or slats K. The vertical deflecting bars or slats K, which are fitted into the draft openings of the regulator frame between the top and bottom plates thereof, are curved in cross-section so as to properly deflect the currents of air caught thereby into the draft box, and each set of the deflecting bars or plates K, is set at a correspondingly opposite angle to the angle of set of the other bars or slats in the opposite one of the draft openings J, and the slats of each set are separated sufficiently from each other to leave air passages therebetween, which communicate directly with the respective channels of the draft box. The central bars or slats of each set have their inner ends adjacently disposed to leave a space L, adapted to receive the projecting tongue extension E, of the partition D, so as to insure the firm positioning of the regulator box, while at the same time cutting off communication between the separate draft openings J.

To the inner vertical edges of the deflecting bars or slats K, are pivoted or hinged one edge of the vertical regulating doors M. The vertical regulating doors M, which are hinged at one edge to the inner vertical edges of the deflecting bars or slats, are adapted to automatically cover and uncover the air passages between the deflecting bars or slats, and are provided at their upper edges or ends with the off-standing arms N, having pivot extremities $n$, adapted to loosely fit perforations O, formed in the horizontal connecting strip or bar P. The horizontal connecting strip or bar P, which is located at the top of the several regulating doors, has the perforations therein disposed so that when one set of the doors covering the passages of one of the draft openings is closed, the opposite set of doors is designed to be opened, and by connecting the separate sets of doors by this single strip means are provided whereby one set of doors closes automatically while the other set opens, and vice versa. The end air passages located at the extreme opposite sides of the regulator frame are covered and uncovered by the separate self-acting end doors Q, pivoted at one edge to the opposite side pieces of the regulator frame and limited in their opening by the flanged stops R, standing off from the inner lower edge of the regulator frame. Now it will be apparent that in whichever direction the wind or air may be stirring outside of the building the same will always find a direct passage through the regulator herein described. Supposing the wind to be blowing fairly against the front of the regulator, the current of air will open both sets of doors sufficiently so as to supply the necessary cold air through the channels of the cold air draft box into the cold air draft pipe. In case the wind strikes the regulator at any side angle, the same would be deflected through the several air passages of one of the draft openings J, and would open the regulating doors at the inner ends of said air passages, and at the same time closing the opposite set of doors. By this means a sufficient quantity of cold air would be directed through one of the channels of the draft box, while the other channel would be closed to cut off any return draft toward the outer air.

Changes in the form, proportion and the minor details of construction may be resorted to without departing from the principle or sacrificing any of the advantages of this invention.

Having thus described the invention, what is claimed, and desired to be secured by Letters Patent, is—

1. In a cold air draft regulator, the combination with a cold air draft pipe; of a draft box removably fitted to the outer end of said pipe and having a central vertical partition, a regulator attachment removably fitted onto the draft box and having separate sets of stationary deflecting slats forming separate sets of air passages communicating at each side of the partition in the draft box, regulating doors hinged at one edge to the inner edges of said slats, and a single connecting strip pivotally connected to the swinging edges of all of said doors connected to both sets of slats, substantially as set forth.

2. In a cold air draft regulator, a centrally partitioned draft box removably fitted to one end of a cold air draft pipe, a regulator attachment connected to the outer end of the draft box and having separate sets of stationary deflecting slats forming there between air passages, and simultaneously controlled sets of regulating doors for said air passages, substantially as set forth.

3. In a cold air draft regulator, a cold air pipe draft box having a central vertical partition provided with a front tongue extension, a removable regulator frame having opposite draft openings and fitted over the outer end of the draft box, opposite sets of vertical deflecting bars or slats fitted at an angle in the draft openings of the regulator frame, the inner bars or slats of each set having their inner ends adjacently disposed to form a space adapted to receive the projecting tongue of said vertical partition, and a series of simultaneously and automatically controlled regulating doors hinged to the inner vertical edges of said bars or slats, substantially as set forth.

4. In a cold air draft regulator, the flanged window casing, a partitioned outwardly flared draft box fitted at one end into said casing, a triangular regulator box removably secured to the outside of said window casing and having opposite draft openings communicating with the interior of the draft box at both sides of its partition, a regularly spaced series of vertical deflecting bars or slats fitted into the draft openings of the regulator frame at an angle, said bars or slats being curved in cross section, a series of connected regulating doors hinged to the inner vertical edges of the bars or slats to cover and uncover the air passages therebetween, and inner end doors hinged to the inner opposite sides of the regulator frame to cover and uncover the end air passages, substantially as set forth.

5. In a cold air draft regulator, a cold air draft pipe box having a central vertical partition, a regulator frame fitted onto one end of the draft box and having separate draft openings, separate sets of inclined deflecting bars or slats fitted into each draft opening of said frame, automatically controlled regulating doors hinged at one edge to the inner vertical edges of said bars or slats and each door being provided at its upper edge with offstanding arms having pivot extremities, and a single horizontal connecting strip or bar having a series of perforations loosely engaging the pivot extremities of the door arms, said strip or bar providing for simultaneously opening one set of doors and closing the other set, and vice versa, substantially as set forth.

In testimony that I claim the foregoing as my own I have hereto affixed my signature in the presence of two witnesses.

AUGUST H. ZIMMERMAN.

Witnesses:
 AUG. RICHTER, Jr.,
 FRED BRANDT.